US012615331B2

(12) United States Patent
Yang et al.

(10) Patent No.: US 12,615,331 B2
(45) Date of Patent: Apr. 28, 2026

(54) SCREEN STATE CONTROL METHOD AND APPARATUS, AND STORAGE MEDIUM

(71) Applicant: JRD COMMUNICATION (SHENZHEN) LTD., Shenzhen (CN)

(72) Inventors: Bo Yang, Shenzhen (CN); Guangyue Luo, Shenzhen (CN); Sixu Ruan, Shenzhen (CN)

(73) Assignee: JRD COMMUNICATION (SHENZHEN) LTD., Shenzhen (CN)

( * ) Notice: Subject to any disclaimer, the term of this patent is extended or adjusted under 35 U.S.C. 154(b) by 441 days.

(21) Appl. No.: 18/317,659

(22) Filed: May 15, 2023

(65) Prior Publication Data

US 2023/0291827 A1      Sep. 14, 2023

Related U.S. Application Data

(63) Continuation-in-part of application No. PCT/CN2020/135235, filed on Dec. 10, 2020.

(30) Foreign Application Priority Data

Nov. 19, 2020      (CN) .......................... 202011303040.5

(51) Int. Cl.
H04M 1/72454      (2021.01)
G01D 5/24      (2006.01)
H04M 1/02      (2006.01)

(52) U.S. Cl.
CPC .......... H04M 1/72454 (2021.01); G01D 5/24 (2013.01); H04M 1/0214 (2013.01)

(58) Field of Classification Search
CPC ... H04M 1/72454; H04M 1/0214; G01D 5/24
See application file for complete search history.

(56) References Cited

U.S. PATENT DOCUMENTS

| 2015/0022090 | A1 | 1/2015 | Kim |
| 2016/0085360 | A1 | 3/2016 | Deng |
| 2019/0042042 | A1* | 2/2019 | Hei ........................ G06F 1/1652 |

FOREIGN PATENT DOCUMENTS

| CN | 108803896 | A | 11/2018 |
| CN | 111163213 | A | 5/2020 |
| CN | 111314610 | A | 6/2020 |
| CN | 111324515 | A | 6/2020 |
| CN | 111600998 | A | 8/2020 |

OTHER PUBLICATIONS

Second Chinese Office Action issued in corresponding Chinese Patent Application No. 202011303040.5 dated Mar. 13, 2024, pp. 1-10.

(Continued)

*Primary Examiner* — Curtis B Odom
(74) *Attorney, Agent, or Firm* — PV IP PC; Wei Te Chung

(57) ABSTRACT

The present application provides a screen state control method and apparatus, and a storage medium. The method includes: detecting a coupling capacitance generated when a folding event occurs, determining whether the coupling capacitance meets a first preset condition; and controlling the screen state based on the coupling capacitance meeting the first preset condition.

20 Claims, 2 Drawing Sheets

Detecting a coupling capacitance generated when a folding event occurs — 201

Determining whether the coupling capacitance meets a first preset condition — 202

Controlling a screen state in response to the coupling capacitance meeting the first preset condition — 203

(56)                References Cited

OTHER PUBLICATIONS

Chinese reject decision issued in corresponding Chinese Patent
Application No. 202011303040.5 dated May 31, 2024, pp. 1-9.
Written Opinion of the International Search Authority in interna-
tional application No. PCT/CN2020/135235, mailed on Aug. 17,
2021.
International Search Report in International application No. PCT/
CN2020/135235, mailed on Aug. 17, 2021.

* cited by examiner 101 103

102 104

| Detecting a coupling capacitance generated when a folding event occurs | 201 |
| Determining whether the coupling capacitance meets a first preset condition | 202 |
| Controlling a screen state in response to the coupling capacitance meeting the first preset condition | 203 |

SCREEN STATE CONTROL METHOD AND APPARATUS, AND STORAGE MEDIUM

CROSS-REFERENCE TO RELATED APPLICATION

This application is a continuation of International Application No. PCT/CN2020/135235, filed on Dec. 10, 2020, which claims priority to and the benefit of Chinese Patent Application No. 202011303040.5, filed on Nov. 19, 2020. The disclosures of the aforementioned applications are incorporated herein by reference in their entireties.

TECHNICAL FIELD

The present application relates to the field of electronic technologies, and more particularly, to a screen state control method and apparatus, and a storage medium.

BACKGROUND

With the rapid development of flexible screen technologies, flexible and foldable screens or flexible and openable screens have been gradually applied to terminal devices, such as cell phones, tablets, wearable devices, and the like. In the prior art, it is generally necessary to additionally provide a specific sensor element for determining a folding state of a folding screen including a Hall element, an infrared sensor, a radar sensor, and a plurality of angular acceleration sensors, so as to determine a display mode of the screen.

SUMMARY

A terminal needs to specifically set the sensor element for determining the folding state of the folding screen to determine the display mode of the screen, which may increase the manufacturing cost of the terminal and occupy the space of the terminal.

In a first aspect, the present application provides a screen state control method, including: detecting a coupling capacitance generated when a folding event occurs; determining whether the coupling capacitance meets a first preset condition; and controlling the screen state based on the coupling capacitance meeting the first preset condition.

In the screen state control method, the determining whether the coupling capacitance meeting the first preset condition includes: detecting a capacitance change value of a capacitance sensor corresponding to the coupling capacitance to determine whether the capacitance change value is greater than a preset threshold value.

In the screen state control method, the detecting of the capacitance change value includes: detecting a first data list of the capacitance sensing region at a first designated moment; and calculating the capacitance change value of the capacitance sensor according to the first data list and a pre-stored basic data list to determine whether the capacitance change value is greater than the preset threshold value.

In the screen state control method, the detecting of the capacitance change value includes: detecting a first data list of the capacitance sensing region at a first designated moment, wherein the first designated moment is a moment after the folding event, and the first data list records a first capacitance value of each of capacitance sensors in the capacitance sensing region after the folding event; and calculating a capacitance change value of the capacitance sensing region according to the first data list and a pre-stored basic data list to determine whether the capacitance change value is greater than the preset threshold value, wherein the basic data list records a second capacitance value corresponding to each of the capacitance sensors in the capacitance sensing region before the folding event.

In the screen state control method, the determining whether the coupling capacitance meets the first preset condition includes: detecting whether a capacitance change rule of the capacitance sensing region corresponding to the coupling capacitance meets a preset rule.

In the screen state control method, the detecting whether the capacitance change rule meets the preset rule includes: detecting a first data list of the capacitance sensing region at a first designated moment; and calculating the capacitance change value of the capacitance sensing region according to the first data list and a pre-stored basic data list to obtain the capacitance change rule of the capacitance sensing region and determine whether the capacitance change rule meets the preset rule.

In the screen state control method, the detecting whether the capacitance change rule of the capacitance sensing region corresponding to the coupling capacitance meets the preset rule includes: detecting a first data list of the capacitance sensing region at a first designated moment, where the first designated moment is a moment after the folding event, and the first data list records a first capacitance value of each of capacitance sensors in the capacitance sensing region after the folding event; and calculating the capacitance change value of the capacitance sensing region according to the first data list and a pre-stored basic data list to obtain the capacitance change rule of the capacitance sensing region and determine whether the capacitance change value meets the preset rule.

In the screen state control method, the determining whether the coupling capacitance meets the first preset condition includes: detecting whether a capacitance change area of the capacitance sensor corresponding to the coupling capacitance is greater than a preset area threshold value.

In the screen state control method, the detecting whether the capacitance change area of the capacitance sensing region corresponding to the coupling capacitance is greater than the preset area threshold value includes: determining a number of capacitance sensors in the capacitance sensing region and a size of each of the capacitance sensors to determine the capacitance change area of the capacitance sensing region; and detecting whether the determined capacitance change area of the capacitance sensor is greater than the preset area threshold value.

In the screen state control method, the detecting whether the capacitance change area of the capacitance sensing region corresponding to the coupling capacitance is greater than the preset area threshold value includes: detecting an arrangement number of the capacitance sensing region or coordinates of the capacitance sensing region in a preset two-dimensional coordinate system; determining a number of capacitance sensors in the capacitance sensing region based on the arrangement number or the number of the coordinates; determine the capacitance change area of the capacitance sensing region based on the number of capacitance sensors and a size of each of the capacitance sensors; and detecting whether the capacitance change area is greater than the preset area threshold value.

In the screen state control method, detecting the folding event includes: monitoring data acquired by a first sensor; determining whether the acquired data meets a second preset condition; and in response to the acquired data meeting the second preset condition, determining that the folding event occurs.

In the screen state control method, detecting the folding event includes: monitoring data acquired by a first sensor; calculating an angle change value of a capacitance sensing region on which the first sensor is disposed from the acquired data; determining whether the angle change value is within a preset angle range; and in response to the angle change value being within the preset angle range, determining that the folding event occurs.

In the screen state control method, after the coupling capacitance meets the first preset condition, the method further includes: in response to the coupling capacitance meeting the first preset condition, determining that a screen is in a folding state, and controlling the screen to be displayed in a first display state; and in response to the coupling capacitance not meeting the first preset condition, determining that a screen is in an unfolding state, and controlling the screen to be displayed in a second display state.

In the screen state control method, the method is applied to a terminal having a folding screen divided into a first capacitance sensing region and a second capacitance sensing region and includes: generating a coupling capacitance by interacting the first capacitance sensing region and the second capacitance sensing region when the folding event occurs; detecting the coupling capacitance generated when the folding event occurs; determining whether the coupling capacitance meets the first preset condition; and controlling the screen state based on the coupling capacitance meeting the first preset condition.

In the screen state control method, detecting the folding event includes: adjusting a magnitude of a voltage applied to a driving line of at least one of the first capacitance sensing region and the second capacitance sensing region; and adjusting a waveform of the voltage applied to the driving line of at least one of the first capacitance sensing region and the second capacitance sensing region.

In a second aspect, the present application provides a computer readable storage medium storing a computer program which, when executed by a computer, causes the computer to perform following steps: detecting a coupling capacitance generated when a folding event occurs; detecting a capacitance change value of a capacitance sensing region corresponding to the coupling capacitance to determine whether the capacitance change value is greater than a preset threshold value; and controlling a screen state based on the capacitance change value being greater than the preset threshold value.

In the storage medium, the detecting of the capacitance change value includes:

detecting a first data list of the capacitance sensing region at a first designated moment, wherein the first designated moment is a moment after the folding event, and the first data list records a first capacitance value of each of capacitance sensors in the capacitance sensing region after the folding event; and calculating a capacitance change value of the capacitance sensing region according to the first data list and a pre-stored basic data list to determine whether the capacitance change value is greater than the preset threshold value, wherein the basic data list records a second capacitance value corresponding to each of the capacitance sensors in the capacitance sensing region before the folding event.

In the storage medium, the computer program, when executed by the computer, further causes the computer to perform following steps: detecting a coupling capacitance generated when the folding event occurs; detecting a capacitance change rule of a capacitance sensing region corresponding to the coupling capacitance to determine whether the capacitance change rule meets a preset rule; and controlling the screen state based on the capacitance change rule meeting the preset rule.

In the storage medium, the computer program, when executed by the computer, further causes the computer to perform following steps: detecting a coupling capacitance generated when the folding event occurs; detecting a capacitance change area of a capacitance sensing region corresponding to the coupling capacitance to determine whether the capacitance change area is greater than a preset area threshold value; and controlling the screen state based on the capacitance change area being greater than the preset area threshold value.

In a third aspect, the present application provides a screen state control apparatus, including: a detection circuit for detecting a coupling capacitance generated when a folding event occurs; a determination circuit for determining whether the coupling capacitance meets a first preset condition; and a control circuit for controlling the screen state based on the coupling capacitance meeting the first preset condition.

The beneficial Effects of the present application are that the folding state of the folding screen can be determined by common sensors including an angular acceleration sensor and a capacitance sensor used in the terminal. The coupling capacitance generated when the folding event occurs is detected; whether the coupling capacitance meets the first preset condition is determined; and the screen state is controlled based on the coupling capacitance meeting the first preset condition. In response to the coupling capacitance meeting the first preset condition, it is determined that the screen is in the folding state and the screen is controlled to be displayed in the first display state. In response to the coupling capacitance not meeting the first preset condition, it is determined that the screen is in the unfolding state, and the screen is controlled to be displayed in the second display state. According to the embodiments of the present application, the state of the folding screen can be controlled by the common sensor devices of the terminal, the manufacturing cost of the terminal is reduced, and the available space of the terminal is increased.

DETAILED DESCRIPTION

Technical solutions in embodiments of the present application will be clearly and completely described below in conjunction with drawings in the embodiments of the present application. Obviously, the described embodiments are only a part of embodiments of the present application, rather than all the embodiments. Any ordinarily skilled person in the technical field of the present invention could still obtain other accompanying drawings without use laborious invention based on the present accompanying drawings.

The present application provides a screen state control method applied to a terminal device having a folding screen. The terminal device detects a coupling capacitance generated when a folding event occurs; determines whether the coupling capacitance meets a first preset condition; and controls the screen state based on the coupling capacitance meeting the first preset condition. An exemplary embodiment of the present application provides a screen state control method applied to a terminal device having a folding screen. The terminal device may be a smartphone, a tablet computer, a notebook, a wearable device, or the like. The terminal device determines the folding state of the folding screen by using common sensor devices including an angular acceleration sensor and a capacitance sensor to determine a display mode of the screen.

In the present embodiment, the screen state control method is applied to a terminal device having a folding screen. The folding screen can be folded inwardly, where the folding inwardly herein means that directions of light emitted from the screen in the folding state of the terminal device after the screen is folded are opposite or partially opposite.

In the embodiment, the folding screen of the terminal device includes a capacitance touch screen.

For a better understanding of the present application, a capacitance sensor in the capacitance touch screen is first described.

Figure 1:
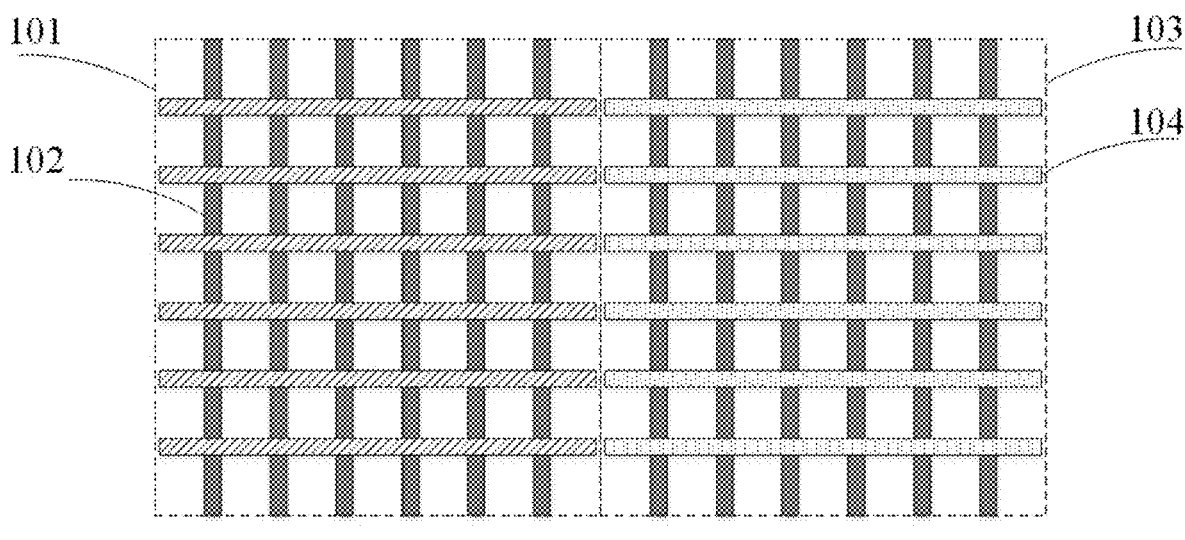
FIG. 1 is a schematic structural diagram of a touch panel of a capacitance touch screen according to an embodiment of the present application.

Referring to FIG. 1, which is a schematic structural diagram of a touch panel of a capacitance touch screen according to an embodiment of the present application.

Specifically, the folding screen may be divided into a first capacitance sensing region 101 and a second capacitance sensing region 103 respectively corresponding to two regions in which the folding screen is relatively folded. The first capacitance sensing region 101 and the second capacitance sensing region 103 include one or more capacitance sensors. Each of the capacitance sensors of the capacitance touch screen of the folding screen includes a transmitting end and a receiving end. The transmitting end includes a driving line 102. The receiving end includes a sensing line 104. The driving lines 102 and the sensing lines 104 are cross-distributed to form a capacitance matrix. A column-by-column driving scanning method is used for the driving lines, and a row-by-row data acquisition method is used for the sensing lines. A processor of a terminal may control whether a voltage is applied to the driving line 102 and the sensing line 104, and detect a capacitance value between the driving line 102 and the sensing line 104. When the folding screen is folded, the capacitance sensors in the first capacitance sensing region 101 and the second capacitance sensing region 103 are brought close to each other, to generate a coupling capacitance, and thus the capacitance value of the capacitance sensor between the driving line and the sensing line is changed. Change of the capacitance values of the capacitance sensors of at least one of the first capacitance sensing region 101 and the second capacitance sensing region 103 is detected to determine the folding state of the folding screen.

Figure 2:
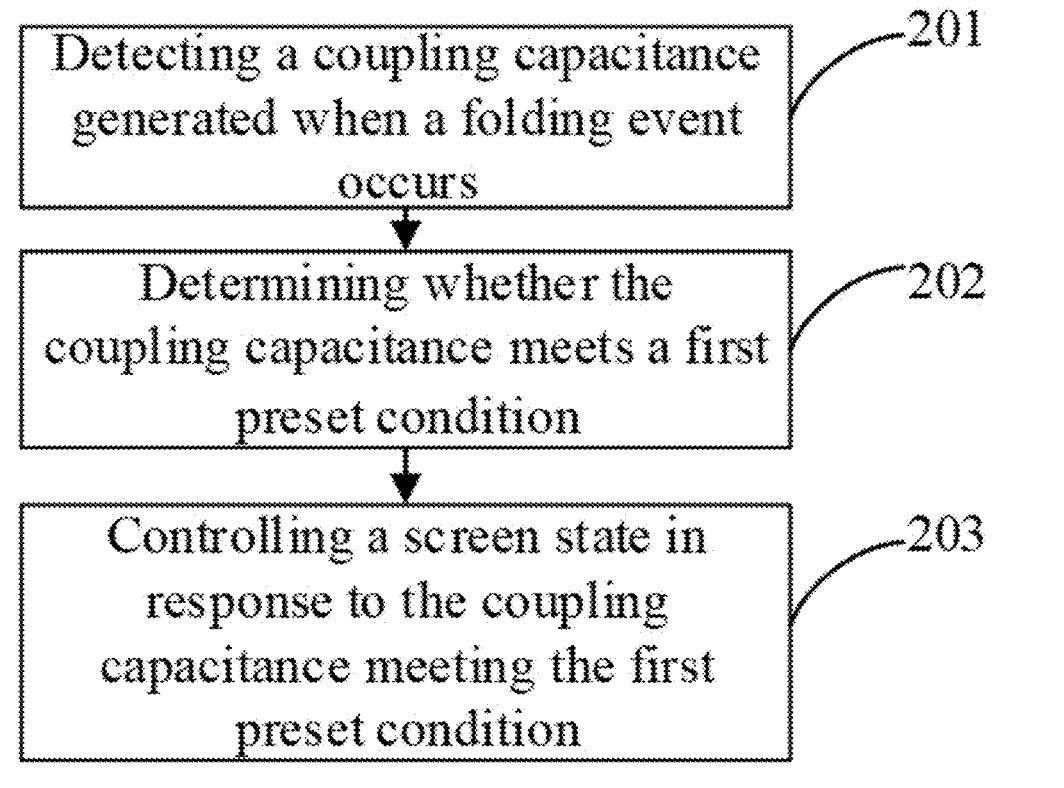
FIG. 2 is a flow diagram of a screen state control method according to an embodiment of the present application.

Referring to FIG. 2, which is a flow diagram of a screen state control method according to an embodiment of the present application.

FIG. 2 shows a screen state control method, which can be applied to a terminal device having a folding screen.

The method may include following steps:

S101 of detecting a coupling capacitance generated when a folding event occurs.

Specifically, the terminal device detects a coupling capacitance generated when the folding event occurs.

Specifically, the folding screen may be divided into a first capacitance sensing region and a second capacitance sensing region, and the folding event is that the first capacitance sensing region or the second capacitance sensing region is folded inwardly, where the folding inwardly means that directions of the light emitted from the screen in the folding state of the terminal device after the screen is folded are opposite or partially opposite.

Specifically, the terminal device may monitor data acquired by an angular acceleration sensor provided in the first capacitance sensing region or the second capacitance sensing region, calculate an angle change value according to the acquired data, and further determine whether the angle change value is within a preset angle range.

Specifically, the preset angle range is between the first angle and 180°, where the first angle is between 20° and 35°. If the acquired data is within the preset angle range, the terminal obtains a screen state detection instruction. The above description is not intended to limit the embodiments of the present application. The preset angle range is not limited to be "between the first angle and 180°, where the first angle is between 20° and 35°", and may be adjusted according to actual requirements, as long as determining whether the angle change value is within the preset angle range falls within the protection scope of the present application.

Specifically, the folding screen may be divided into a first capacitance sensing region and a second capacitance sensing region. After the folding screen is folded, a coupling capacitance is generated, and thus capacitance values of the capacitance sensors in the first capacitance sensing region and the second capacitance sensing region are changed.

Specifically, the folding screen may be divided into a first capacitance sensing region and a second capacitance sensing region. According to the folding event, the terminal device stops applying a voltage to each of the driving lines 102 of the second capacitance sensing region, and the capacitance value of each of the capacitance sensors in the first capacitance sensing region may be decreased. After the folding screen is folded, a coupling capacitance is generated, and a capacitance value of the first capacitance sensing region and a capacitance value of the second capacitance sensing region interact to detect change of the capacitance value of the first capacitance sensing region and the capacitance value of the second capacitance sensing region.

Specifically, the folding screen may be divided into a first capacitance sensing region and a second capacitance sensing region. According to the folding event, the terminal device adjusts a magnitude of the voltage applied to each of the driving lines 102 of the second capacitance sensing region. After the folding screen is folded, a coupling capacitance is generated, and a capacitance value of the first capacitance sensing region and a capacitance value of the second capacitance sensing region interact to detect change of the capacitance value of the first capacitance sensing region and the capacitance value of the second capacitance sensing region.

Specifically, the folding screen may be divided into a first capacitance sensing region and a second capacitance sensing region. According to the folding event, the terminal device adjusts the waveform of the voltage applied to each of the driving lines 102 of the second capacitance sensing region. After the folding screen is folded, a coupling capacitance is generated, and a capacitance value of the first capacitance sensing region and a capacitance value of the second capacitance sensing region interact to detect change of the capacitance value of the first capacitance sensing region and the capacitance value of the second capacitance sensing region.

S102 of determining whether the coupling capacitance meets a first preset condition.

Specifically, the folding screen receives the coupling capacitance generated when the folding event occurs to determine whether the coupling capacitance meets the first preset condition.

Specifically, a screen state detection instruction can be obtained according to the folding event.

Specifically, determining whether the coupling capacitance meets the first preset condition includes: detecting a capacitance change value of a capacitance sensor corresponding to the coupling capacitance to determine whether the capacitance change value is greater than a preset threshold value; and in response to the capacitance change value being greater than the preset threshold value, determining that the coupling capacitance meets the first preset condition.

Specifically, the detecting of the capacitance change value includes: detecting a first data list of the capacitance sensing region at a first designated moment, where the first designated moment refers to a moment after the screen state detection instruction can be obtained according to the folding event, and the first data list records a first capacitance value of each of the capacitance sensors in the capacitance sensing region after the screen state detection instruction can be obtained according to the folding event; and calculating the capacitance change value of the capacitance sensor according to the first data list and a pre-stored basic data list to determine whether the capacitance change value is greater than the preset threshold value, where the basic data list records a second capacitance value of each of the capacitance sensors in the capacitance sensing region before the screen state detection instruction can be obtained according to the folding event.

Specifically, determining whether the coupling capacitance meets the first preset condition includes detecting whether a capacitance change rule of the capacitance sensing region corresponding to the coupling capacitance meets a preset rule.

Specifically, the detecting whether the capacitance change rule meets the preset rule includes: detecting a first data list of the capacitance sensing region at a first designated moment, where the first designated moment is a moment after the screen state detection instruction can be obtained according to the folding event, and the first data list records a first capacitance value of each of capacitance sensors in the capacitance sensing region after the screen state detection instruction can be obtained according to the folding event; and calculating the capacitance change value of the capacitance sensing region according to the first data list and a pre-stored basic data list to obtain the capacitance change rule of the capacitance sensing region and determine whether the capacitance change rule meets the preset rule.

Specifically, detecting the pre-stored basic data list includes: obtaining, according to a preset method, a second data list of the capacitance sensors at each of second specified moments, where each of the second specified moments is a moment at which no screen state detection instruction can be obtained according to the folding event and corresponds to the second data list, and the second data list records a third capacitance value corresponding to each of the capacitance sensors at the second specified moment; and obtaining a sum of the third capacitance values corresponding to the capacitance sensors according to a preset correspondence relationship of the capacitance sensors in the second data list, where the capacitance sensor is any one of the capacitance matrices constituting the capacitance touch screen; calculating a specified average capacitance value corresponding to each of the capacitance sensors according to the sum of the third capacitance values, and obtaining an average capacitance value corresponding to each of the capacitance sensors according to a calculation process of the specified average capacitance value; assigning the average capacitance value corresponding to each of the capacitance sensors to the second capacitance value corresponding to the capacitance sensor to obtain the basic data list.

Specifically, the determining whether the coupling capacitance meets the first preset condition includes detecting whether a capacitance change area of the capacitance sensing region corresponding to the coupling capacitance meets a preset area threshold value.

Specifically, the detecting whether the capacitance change area of the capacitance sensing region corresponding to the coupling capacitance is greater than the preset area threshold value includes: determining a number of capacitance sensors in the capacitance sensing region and a size of each of the capacitance sensors to determine a capacitance change area of the capacitance sensing region; and detecting whether the determined capacitance change area of the capacitance sensor is greater than the preset area threshold value.

Specifically, the detecting whether the capacitance change area of the capacitance sensing region corresponding to the coupling capacitance is greater than the preset area threshold value includes detecting an arrangement number of the capacitance sensing region or coordinates of the capacitance sensing region in a preset two-dimensional coordinate system; determining a number of capacitance sensors in the capacitance sensing region based on the arrangement number or the number of the coordinates; determine the capacitance change area of the capacitance sensing region based on the number of capacitance sensors and a size of each of the capacitance sensors; and detecting whether the capacitance change area is greater than the preset area threshold value.

S103 of controlling the screen state based on the coupling capacitance meeting the first preset condition.

Specifically, the screen state control method is applied to a terminal device having a folding screen. The folding screen can be folded inwardly, where the folding inwardly herein means that directions of light emitted from the screen in the folding state of the terminal device after the screen is folded are opposite or partially opposite.

If it is detected that the coupling capacitance meets the first preset condition, then it is determined that the screen is in the folded state to control the folding screen to be displayed in the first display state. If it is detected that the coupling capacitance does not meet the first preset condition, then it is determined that the screen is in the unfolding state to control the folding screen to be displayed in the second display state. The first display state is an off state and the second display state is an on state.

Specifically, the screen state control method is applied to a terminal device having at least two screens, at least one of which is a folding screen. The two screens are parallel to a plane formed by intersection of an X-axis and a Y-axis, respectively, and arranged back-to-back in a Z-axis direction. The back-to-back arrangement described herein means that light rays emitted from the two screens in the on state are emitted in opposite directions. Only one screen of the two screens may be the folding screen and the other screen may be a flat screen alternatively, it is also possible that the two screens are folding screens. The folding screen can be folded inwardly, where the folding inwardly herein means that directions of light emitted from the screen in the folding state of the terminal device after the screen is folded are opposite or partially opposite.

Specifically, only one screen of the two screens of the terminal device is the folding screen, and the other screen is a flat screen. The flat screen and the folding screen in the unfolding state are arranged back-to-back. The folding screen is used as an inner screen of the terminal device, and the flat screen is used as an outer screen of the terminal device. The folding screen is a first screen, and the flat screen is a second screen.

Specifically, the two screens both are folding screens, and may have exactly equal sizes. When one of the two screens is a folding screen and the other is a flat screen, the area of the flat screen is smaller than that of the folding screen. For example, the area of the flat screen may be equal to half of the area of the folding screen or may be smaller than half of the area of the folding screen.

If it is detected that the coupling capacitance meets the first preset condition, it is determined that the folding screen is in the folded state to control the folding screen to be displayed in a first display state and the other screen of the two screens to be displayed in a second display state, where the first display state is an off state and the second display state is an on state. If it is detected that the coupling capacitance does not meet the first preset condition, it is determined that the folding screen is in the unfolding state to control the folding screen to be displayed in a second display state and the other screen of the two screens to be displayed in a first display state, where the first display state is an off state and the second display state is an on state.

An embodiment of the present application further provides a screen state control apparatus that may be integrated in a mobile terminal. The mobile terminal may be a smartphone, a tablet computer, a desktop computer, a smart watch, or the like.

Figure 3:
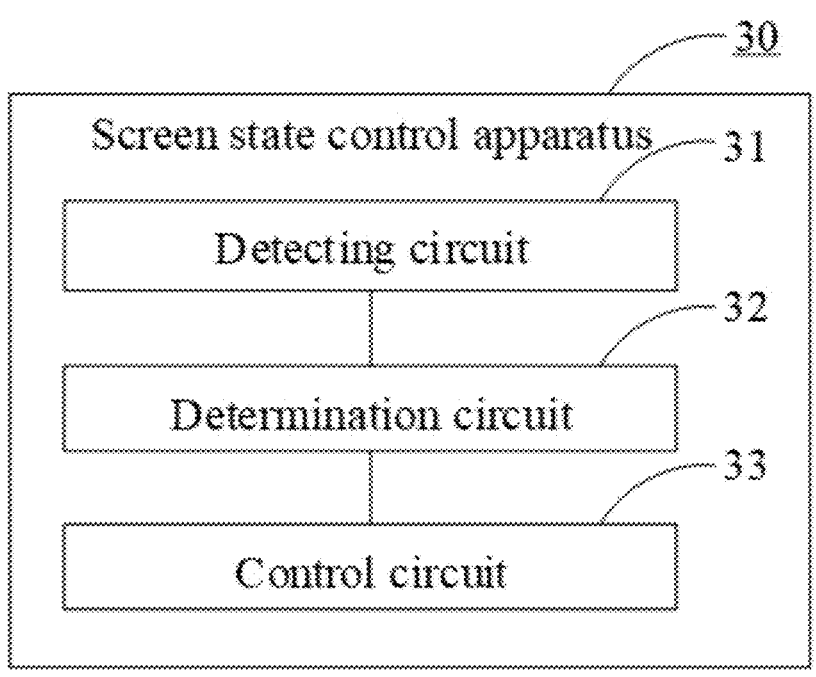
FIG. 3 is a schematic structural diagram of a screen state control apparatus according to an embodiment of the present application.

Referring to FIG. 3, which is a schematic structural diagram of a screen state control apparatus according to an embodiment of the present application. The screen state control apparatus 30 can include: a detection circuit 31 for detecting a coupling capacitance generated when a folding event occurs; a determination circuit 32 for determining whether the coupling capacitance meets a first preset condition; and a control circuit 33 for controlling the screen state based on the coupling capacitance meeting the first preset condition.

In some embodiments, the detection circuit 31 may be specifically configured for detecting a coupling capacitance generated when the folding event occurs.

In some embodiments, the folding screen may be divided into a first capacitance sensing region and a second capacitance sensing region, and the folding event is that the first capacitance sensing region or the second capacitance sensing region is folded inwardly, where the folding inwardly means that directions of the light emitted from the screen in the folding state of the terminal device after the screen is folded are opposite or partially opposite.

In some embodiments, the detection circuit 31 may be specifically configured for monitoring data acquired by an angular acceleration sensor provided in the first capacitance sensing region or the second capacitance sensing region, calculating an angle change value according to the acquired data, and further determining whether the angle change value is within a preset angle range.

In some embodiments, the preset angle range is between the first angle and 180°, where the first angle is between 20° and 35°. If the acquired data is within the preset angle range, the terminal obtains a screen state detection instruction. The above description is not intended to limit the embodiments of the present application. The preset angle range is not limited to be "between the first angle and 180°, where the first angle is between 20° and 35°", and may be adjusted according to actual requirements, as long as determining whether the angle change value is within the preset angle range falls within the protection scope of the present application.

In some embodiments, the folding screen may be divided into a first capacitance sensing region and a second capacitance sensing region. After the folding screen is folded, a coupling capacitance is generated, and thus capacitance values of the capacitance sensors in the first capacitance sensing region and the second capacitance sensing region are changed.

In some embodiments, specifically, the folding screen may be divided into a first capacitance sensing region and a second capacitance sensing region. According to the folding event, the terminal device stops applying a voltage to each of the driving lines 102 of the second capacitance sensing region, and the capacitance value of each of the capacitance sensors in the first capacitance sensing region may be decreased. After the folding screen is folded, a coupling capacitance is generated, and a capacitance value of the first capacitance sensing region and a capacitance value of the second capacitance sensing region interact to detect change of the capacitance value of the first capacitance sensing region and the capacitance value of the second capacitance sensing region.

In some embodiments, the folding screen may be divided into a first capacitance sensing region and a second capacitance sensing region. According to the folding event, the terminal device adjusts a magnitude of the voltage applied to each of the driving lines 102 of the second capacitance sensing region. After the folding screen is folded, a coupling capacitance is generated, and a capacitance value of the first capacitance sensing region and a capacitance value of the second capacitance sensing region interact to detect change of the capacitance value of the first capacitance sensing region and the capacitance value of the second capacitance sensing region.

In some embodiments, the folding screen may be divided into a first capacitance sensing region and a second capacitance sensing region. According to the folding event, the terminal device adjusts the waveform of the voltage applied to each of the driving lines 102 of the second capacitance sensing region. After the folding screen is folded, a coupling capacitance is generated, and a capacitance value of the first capacitance sensing region and a capacitance value of the second capacitance sensing region interact to detect change of the capacitance value of the first capacitance sensing region and the capacitance value of the second capacitance sensing region.

In some embodiments, the determination circuit 32 is specifically configured for determining whether the coupling capacitance meets a first preset condition.

In some embodiments, the folding screen receives the coupling capacitance generated when the folding event occurs to determine whether the coupling capacitance meets the first preset condition.

In some embodiments, a screen state detection instruction can be obtained according to the folding event.

In some embodiments, the determination circuit 32 is specifically configured for: detecting whether a capacitance change value of a capacitance sensing region in which the coupling capacitance is received is greater than a preset threshold value; and if the capacitance change value is greater than the preset threshold value, determining that the coupling capacitance meets the first preset condition.

In some embodiments, the determination circuit 32 is specifically configured for: detecting a first data list of the capacitance sensing region at a first designated moment, where the first designated moment refers to a moment after the screen state detection instruction can be obtained according to the folding event, and the first data list records a first capacitance value of each of the capacitance sensors in the capacitance sensing region after the screen state detection instruction can be obtained according to the folding event; and calculating a capacitance change value of the capacitance sensing region according to the first data list and a pre-stored basic data list to determine whether the capacitance change value is greater than the preset threshold value, where the basic data list records a second capacitance value corresponding to each of the capacitance sensors in the capacitance sensing region before the screen state detection instruction can be obtained according to the folding event.

In some embodiments, the determination circuit 32 is specifically configured for detecting whether a capacitance change rule of the capacitance sensing region corresponding to the coupling capacitance meets a preset rule.

In some embodiments, the determination circuit 32 is specifically configured for: detecting a first data list of the capacitance sensing region at a first designated moment, where the first designated moment is a moment after the screen state detection instruction can be obtained according to the folding event, and the first data list records a first capacitance value of each of capacitance sensors in the capacitance sensing region after the screen state detection instruction can be obtained according to the folding event; and calculating a capacitance change value of the capacitance sensing region according to the first data list and a pre-stored basic data list to obtain the capacitance change rule of the capacitance sensors and determine whether the capacitance change rule meets the preset rule.

In some embodiments, detecting the pre-stored basic data list includes: obtaining, according to a preset method, a second data list of the capacitance sensors at each of second specified moments, where each of the second specified moments is a moment at which no screen state detection instruction can be obtained according to the folding event and corresponds to the second data list, and the second data list records a third capacitance value corresponding to each of the capacitance sensors at the second specified moment; and obtaining a sum of the third capacitance values corresponding to the capacitance sensors according to a preset correspondence relationship of the capacitance sensors in the second data list, where the capacitance sensor is any one of the capacitance matrices constituting the capacitance touch screen; calculating a specified average capacitance value corresponding to each of the capacitance sensors according to the sum of the third capacitance values, and obtaining an average capacitance value corresponding to each of the capacitance sensors according to a calculation process of the specified average capacitance value; assigning the average capacitance value corresponding to each of the capacitance sensors to the second capacitance value corresponding to the capacitance sensor to obtain the basic data list.

In some embodiments, the determining whether the coupling capacitance meets the first preset condition includes detecting whether a capacitance change area of the capacitance sensing region corresponding to the coupling capacitance meets a preset area threshold value.

In some embodiments, the determination circuit 32 is specifically configured for: determining a number of capacitance sensors in the capacitance sensing region and a size of each of the capacitance sensors to determine a capacitance change area of the capacitance sensing region; and detecting whether the determined capacitance change area of the capacitance sensor is greater than the preset area threshold value.

In some embodiments, the determination circuit 32 is specifically configured for: determining the capacitance change area based on the number of capacitance sensors and the size of each of the capacitance sensors in the capacitance sensing region; and detecting whether the capacitance change area of the capacitance sensing region is greater than the preset area threshold value.

In some embodiments, the control circuit 33 is specifically configured for: controlling the screen state based on the coupling capacitance meeting the first preset condition.

In some embodiments, the screen state control apparatus is applied to a terminal device having a folding screen. The folding screen can be folded inwardly, where the folding inwardly herein means that directions of light emitted from the screen in the folding state of the terminal device after the screen is folded are opposite or partially opposite.

If it is detected that the coupling capacitance meets the first preset condition, it is determined that the screen is in the folded state and the folding screen is controlled to be displayed in the first display state. If it is detected that the coupling capacitance does not meet the first preset condition, it is determined that the screen is in the unfolding state and the folding screen is controlled to be displayed in the second display state. The first display state is an off state and the second display state is an on state.

In some embodiments, the screen state control method is applied to a terminal device having at least two screens, at least one of which is a folding screen. The two screens are parallel to a plane formed by intersection of an X-axis and a Y-axis, respectively, and arranged back-to-back in a Z-axis direction. The back-to-back arrangement described herein means that light rays emitted from the two screens in the on state are emitted in opposite directions. Only one screen of the two screens may be the folding screen and the other screen may be a flat screen. alternatively, it is also possible that the two screens are folding screens. The folding screen can be folded inwardly, where the folding inwardly herein means that directions of light emitted from the screen in the folding state of the terminal device after the screen is folded are opposite or partially opposite.

In some embodiments, only one screen of the two screens of the terminal device is the folding screen, and the other screen is a flat screen. The flat screen and the folding screen in the unfolding state are arranged back-to-back. The folding screen is used as an inner screen of the terminal device, and the flat screen is used as an outer screen of the terminal device. The folding screen is a first screen, and the flat screen is a second screen.

In some embodiments, the two screens both are folding screens, and may have exactly equal sizes. When one of the two screens is a folding screen and the other is a flat screen, the area of the flat screen is smaller than that of the folding screen. For example, the area of the flat screen may be equal to half of the area of the folding screen or may be smaller than half of the area of the folding screen.

If it is detected that the coupling capacitance meets the first preset condition, it is determined that the folding screen is in the folded state and the folding screen is controlled to be displayed in a first display state and the other screen of the two screens to be displayed in a second display state, where the first display state is an off state and the second display state is an on state. If it is detected that the coupling capacitance does not meet the first preset condition, it is determined that the folding screen is in the unfolding state and the folding screen is controlled to be displayed in a second display state and the other screen of the two screens to be displayed in a first display state, where the first display state is an off state and the second display state is an on state.

It can be known from above that the screen state control apparatus 30 can include: the detection circuit 31 for detecting the coupling capacitance generated when the folding event occurs; the determination circuit 32 for determining whether the coupling capacitance meets the first preset condition; and the control circuit 33 for controlling the screen state based on the coupling capacitance meeting the first preset condition.

The present application provides a computer readable storage medium storing a computer program which, when executed by a computer, causes the computer to perform following steps.

Detecting a coupling capacitance generated when a folding event occurs.

The computer program, when executed by the computer, causes the computer to monitor data acquired by an angular acceleration sensor provided in the first capacitance sensing region or the second capacitance sensing region, calculate an angle change value according to the acquired data, and further determine whether the angle change value is within a preset angle range.

The preset angle range is between the first angle and 180°, where the first angle is between 20° and 35°. If the acquired data is within the preset angle range, a screen state detection instruction is obtained.

The computer program, when executed by the computer, causes the computer to, according to the folding event, stop applying a voltage to each of the driving lines of the second capacitance sensing region, so that the capacitance value of each of the capacitance sensors in the first capacitance sensing region may be decreased. After the folding screen is folded, a coupling capacitance is generated, and a capacitance value of the first capacitance sensing region and a capacitance value of the second capacitance sensing region interact to detect change of the capacitance value of the first capacitance sensing region and the capacitance value of the second capacitance sensing region.

The computer program, when executed by the computer, causes the computer to, according to the folding event, adjust a magnitude of the voltage applied to each of the driving lines of the second capacitance sensing region. After the folding screen is folded, a coupling capacitance is generated, and a capacitance value of the first capacitance sensing region and a capacitance value of the second capacitance sensing region interact to detect change of the capacitance value of the first capacitance sensing region and the capacitance value of the second capacitance sensing region.

The computer program, when executed by the computer, causes the computer to, according to the folding event, adjust the waveform of the voltage applied to each of the driving lines of the second capacitance sensing region. After the folding screen is folded, a coupling capacitance is generated, and a capacitance value of the first capacitance sensing region and a capacitance value of the second capacitance sensing region interact to detect change of the capacitance value of the first capacitance sensing region and the capacitance value of the second capacitance sensing region.

Determining whether the coupling capacitance meets a first preset condition.

A screen state detection instruction can be obtained according to the folding event.

The computer program, when executed by the computer, causes the computer to detect whether a capacitance change value of a capacitance sensing region in which the coupling capacitance is received is greater than a preset threshold value; and if the capacitance change value is greater than the preset threshold value, determine that the coupling capacitance meets the first preset condition.

The computer program, when executed by the computer, causes the computer to detect a first data list of the capacitance sensing region at a first designated moment, where the first designated moment refers to a moment after the screen state detection instruction can be obtained according to the folding event, and the first data list records a first capacitance value of each of the capacitance sensors in the capacitance sensing region after the screen state detection instruction can be obtained according to the folding event; and calculate a capacitance change value of the capacitance sensing region according to the first data list and a pre-stored basic data list to determine whether the capacitance change value is greater than the preset threshold value, where the basic data list records a second capacitance value corresponding to each of the capacitance sensors in the capacitance sensing region before the screen state detection instruction can be obtained according to the folding event.

The computer program, when executed by the computer, causes the computer to detect whether a capacitance change rule of the capacitance sensing region corresponding to the coupling capacitance meets a preset rule.

The computer program, when executed by the computer, causes the computer to detect a first data list of the capacitance sensing region at a first designated moment, where the first designated moment is a moment after the screen state detection instruction can be obtained according to the folding event, and the first data list records a first capacitance value of each of capacitance sensors in the capacitance sensing region after the screen state detection instruction can be obtained according to the folding event; and calculate a capacitance change value of the capacitance sensing region according to the first data list and a pre-stored basic data list to obtain the capacitance change rule of the capacitance sensing region and determine whether the capacitance change rule meets the preset rule.

The computer program, when executed by the computer, causes the computer to obtain, according to a preset method, a second data list of the capacitance sensors at each of second specified moments, where each of the second specified moments is a moment at which no screen state detection instruction can be obtained according to the folding event and corresponds to the second data list, and the second data list records a third capacitance value corresponding to each of the capacitance sensors at the second specified moment; and obtain a sum of the third capacitance values corresponding to the capacitance sensors according to a preset correspondence relationship of the capacitance sensors in the second data list, where the capacitance sensor is any one of the capacitance matrices constituting the capacitance touch screen; calculating a specified average capacitance value corresponding to each of the capacitance sensors according to the sum of the third capacitance values, and obtaining an average capacitance value corresponding to each of the capacitance sensors according to a calculation process of the specified average capacitance value; assigning the average capacitance value corresponding to each of the capacitance sensors to the second capacitance value corresponding to the capacitance sensor to obtain the basic data list.

The computer program, when executed by the computer, causes the computer to detect whether a capacitance change area of the capacitance sensing region corresponding to the coupling capacitance meets a preset area threshold value.

The computer program, when executed by the computer, causes the computer to determine a number of capacitance sensors in the capacitance sensing region and a size of each of the capacitance sensors to determine a capacitance change area of the capacitance sensing region; and detect whether the capacitance change area of the capacitance sensor is greater than the preset area threshold value.

Specifically, the computer program, when executed by the computer, causes the computer to detect an arrangement number of the capacitance sensing region or coordinates of the capacitance sensing region in a preset two-dimensional coordinate system; determine a number of capacitance sensors in the capacitance sensing region based on the arrangement number or the number of the coordinates; determine the capacitance change area based on the number of capacitance sensors and a size of each of the capacitance sensors in the capacitance sensing region; and detect whether the capacitance change area of the capacitance sensing region is greater than the preset area threshold value.

Controlling the screen state based on the coupling capacitance meeting the first preset condition.

If it is detected that the coupling capacitance meets the first preset condition, it is determined that the folding screen is in the folded state and the folding screen is controlled to be displayed in a first display state and the other screen of the two screens to be displayed in a second display state, where the first display state is an off state and the second display state is an on state. If it is detected that the coupling capacitance does not meet the first preset condition, it is determined that the folding screen is in the unfolding state and the folding screen is controlled to be displayed in a second display state and the other screen of the two screens to be displayed in a first display state, where the first display state is an off state and the second display state is an on state.

An embodiment of the present application further provides a mobile terminal. The mobile terminal may be a smartphone, a tablet computer, a smart watch, or the like.

Figure 4:
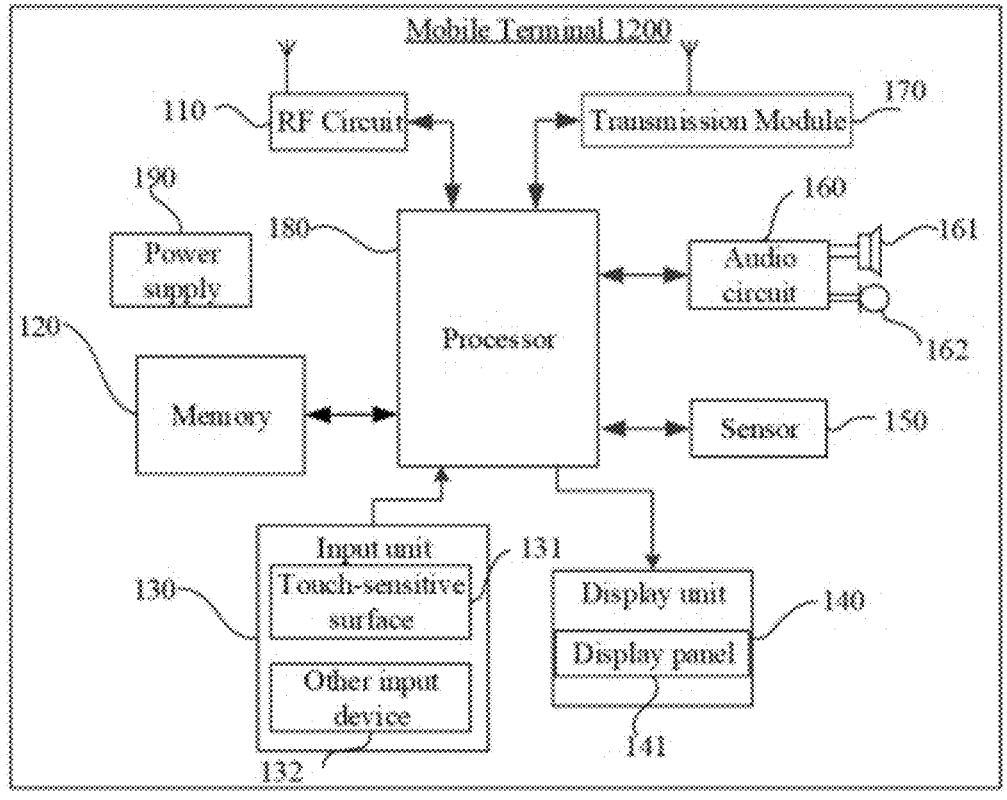
FIG. 4 is a schematic structural diagram of a mobile terminal according to an embodiment of the present application.

Referring to FIG. 4, which illustrates a structural schematic diagram of a mobile terminal provided by an embodiment of the present application. The mobile terminal can be used for implementing the screen state control method provided in any one of the above-mentioned embodiments. The mobile terminal 1200 may be a smartphone or a tablet computer.

Referring to FIG. 4, which illustrates a structural schematic diagram of a mobile terminal provided by an embodiment of the present application. The mobile terminal can be used for implementing the screen state control method provided in any one of the above-mentioned embodiments. The mobile terminal 1200 may be a smartphone or a tablet computer.

As shown in FIG. 4, the mobile terminal 1200 may include components such as an Radio Frequency (RF) circuit 110, a memory 120 including one or more computer readable storage media (only one shown in the figure), an input unit 130, a display unit 140, a sensor 150, an audio circuit 160, a transmission module 170, a processor 180 including one or more processing cores (only one shown in the figure), and a power supply 190. It should be understood by those skilled in the art that the structure of the mobile terminal 1200 shown in FIG. 4 is not intended to limit the mobile terminal, and may include more or fewer components than shown, or some combination of components, or different arrangements of components.

An RF circuit 110 is configured to receive and transmit electromagnetic waves and to realize conversions of the electromagnetic waves and electrical signals, thereby communicating with a communication network or any other device. The RF circuit 110 can include various conventional circuit elements used for performing these functions, for example, an antenna, a radio frequency transmitter, a digital signal processor, an encryption/decryption chip, a subscriber identification module (SIM) card, a memory and the like. The RF circuit 110 can communicate with various networks, for example, an internet, an intranet or a wireless network, or can communicate with any other device via a wireless network.

The memory 120 may be used to store software programs and modules, such as program instructions/modules corresponding to the screen state control method in the above embodiments, and the processor 180 executes various functional applications and data processing by running the software programs and modules stored within the memory 120. The memory 120 can include a high speed random access memory and also can include a non-volatile memory, such as one or more disk storage devices, a flash memory device or other non-volatile solid storage devices. In some embodiments, the memory 120 can further include a remote memory disposed corresponding to the processor 180. The remote memory can be connected to the mobile terminal 1200 via a network. Examples of the network include but are not limited to an internet, an intranet, a local area network, a mobile communication network and the combinations of them.

An input unit 130 can be configured to receive input number or character information and to generate keyboard, mouse, joystick, optical or trajectory ball signal inputs related to a user's setting and functional control. In detail, the input unit 130 can include a touch-sensitive surface 131 and other input devices 132. The touch-sensitive surface 131, also called a touch display screen or a touch panel, can be configured to detect touch operations of a user on or near the touch-sensitive surface 131 (for example, operations carried out by the user through any suitable objects or attachments, such as a finger, a touch pen and the like, on the touch-sensitive surface 131 or near the touch-sensitive surface 331) and to drive a corresponding device connected therewith according to a preset program. Besides the touch-sensitive surface 131, the input unit 130 also can include the other input devices 132. In detail, other input devices 132 can include, but is not limited to, one or more of a physical keyboard, function keys (such as a volume control key, a switching key and the like), a trackball, a mouse, a joystick and the like.

A display unit 140 can be configured to display information input by the user or information provided for the user and various graphical user interfaces of the mobile terminal 1200. The graphical user interfaces can be constituted by graphics, texts, icons, videos and any combinations of them. The display unit 140 can include a display panel 141. Furthermore, the touch panel 131 can cover the display panel 141. When the touch-sensitive surface 131 detects a touch operation on or near it, the signal caused by the touch operation is transmitted to the processor 180 to determine the type of a touch event. Then, the processor 180 provides a corresponding visual output on the display panel 141 according to the type of the touch event. The display unit 140 is the screen in the above embodiments.

The mobile terminal 1200 can further include at least one sensor 150, such as an optical sensor, a motion sensor and other sensors. Specifically, the light sensor can comprise an ambient light sensor and a proximity sensor. Of course, the mobile terminal may also be provided with other sensors such as gyroscopes, barometers, hygrometers, thermometers, infrared sensors, etc., which will not be described in detail herein.

The audio circuit 160, a speaker 161, and a microphone 162 can provide an audio interface between the user and the terminal device 1200. The audio circuit 160 converts received audio data to an electrical signal and transmits the electrical signal to the speaker 161. The speaker 161 converts the electrical signal to sound signals and outputs the sound signals. In addition, the microphone 162 converts collected sound signal to an electrical signal. The audio circuit 160 converts the electrical signal to audio data and transmits the audio data to the processor 180 for further processing. After the processing, the audio data may be transmitted to another terminal via the RF circuit 110, or transmitted to the memory 120 for further processing. The audio circuit 160 may further include an earphone jack for providing communication between an external earphone and the terminal device 1200.

The terminal device 1200 can be configured to, by the transmission module 170 (such as a WI-FI module), send and receive emails, browse a webpage, and access to streaming media, and so on. It provides the user with wireless broadband internet access. It should be understood that although the transmission module 170 is illustrated in FIG. 4, this module is not an essential component for the terminal device 1200 and can be omitted according to needs without departing from the scope of the present invention.

The processor 180 functions as a control center of the terminal device 1200 and is configured to connect each component of the cell phone using various interfaces and circuits, and is configured to execute the various functions of the terminal device 1200 and to perform data processing by running or executing the software programs and/or modules stored in the memory 120 and calling the data stored in the memory 120, thereby monitoring the overall cell phone. Optionally, the processor 180 can include one or more processing cores. In some embodiments, an application processor and a modulation/demodulation processor can be integrated to form the processor 180. The application processor is primarily configured to process an operating system, user interfaces, application programs, and so on. The modulation/demodulation processor is primarily configured to process wireless communication. It should be understood that the modulation/demodulation processor can be independent from the processor 180.

The terminal device 1200 further includes the power supply 190 (such as a battery) configured to provide power for the various components of the terminal device 300. In some embodiments, the power supply can be logically coupled to the processor 180 via a power management system that controls charging, discharging, power consumption, and so on. The power supply 190 may further include one or more direct current (DC)/or alternating current (AC) power sources, recharging system, power failure detection circuit, power converter or inverter, power supply status indicator, and the like.

Although not being shown, the terminal device 1200 may include a camera (such as a front camera and a rear camera), a BLUETOOTH module, and so on, which are not repeated herein. In the present embodiment, a display unit 140 of the mobile terminal 1200 is a display with a touch screen. The terminal device 1200 further includes a memory 120 and one or more programs. The one or more programs are stored in the memory 120. After configuration, one or more processors 180 execute the one or more programs, which include the following operating instructions of detecting a coupling capacitance generated when a folding event occurs; determining whether the coupling capacitance meets a first preset condition; and controlling the screen state based on the coupling capacitance meeting the first preset condition.

In some embodiments, the processor 180 is configured to monitor data acquired by an angular acceleration sensor provided in the first capacitance sensing region or the second capacitance sensing region, calculate an angle change value according to the acquired data, and further determine whether the angle change value is within a preset angle range.

In some embodiments, the processor 180 is configured to, according to the folding event, stop applying a voltage to each of the driving lines of the second capacitance sensing region, so that the capacitance value of each of the capacitance sensors in the first capacitance sensing region may be decreased. After the folding screen is folded, a coupling capacitance is generated, and a capacitance value of the first capacitance sensing region and a capacitance value of the second capacitance sensing region interact to detect change of the capacitance value of the first capacitance sensing region and the capacitance value of the second capacitance sensing region.

In some embodiments, the processor 180 is configured to change the voltage applied to each of the driving lines 102 of the second capacitance sensing region according to the folding event. After the folding screen is folded, a coupling capacitance is generated, and a capacitance value of the first capacitance sensing region and a capacitance value of the second capacitance sensing region interact to detect change of the capacitance value of the first capacitance sensing region and the capacitance value of the second capacitance sensing region.

In some embodiments, the processor 180 is configured to change the waveform of the voltage applied to each of the driving lines 102 of the second capacitance sensing region according to the folding event. After the folding screen is folded, a coupling capacitance is generated, and a capacitance value of the first capacitance sensing region and a capacitance value of the second capacitance sensing region interact to detect change of the capacitance value of the first capacitance sensing region and the capacitance value of the second capacitance sensing region.

In some embodiments, the processor 180 is configured to detect whether a capacitance change value of a capacitance sensing region in which the coupling capacitance is received is greater than a preset threshold value; and if the capacitance change value is greater than the preset threshold value, determine that the coupling capacitance meets the first preset condition.

In some embodiments, the processor 180 is configured to detect a first data list of the capacitance sensing region at a first designated moment, where the first designated moment refers to a moment after the screen state detection instruction can be obtained according to the folding event, and the first data list records a first capacitance value of each of the capacitance sensors in the capacitance sensing region after the screen state detection instruction can be obtained according to the folding event; and calculate a capacitance change value of the capacitance sensing region according to the first data list and a pre-stored basic data list to determine whether the capacitance change value is greater than the preset threshold value, where the basic data list records a second capacitance value corresponding to each of the capacitance sensors in the capacitance sensing region before the screen state detection instruction can be obtained according to the folding event.

In some embodiments, the processor 180 is configured to detect whether a capacitance change rule of the capacitance sensor corresponding to the coupling capacitance meets a preset rule.

In some embodiments, the processor 180 is configured to detect a first data list of the capacitance sensing region at a first designated moment, where the first designated moment refers to a moment after the screen state detection instruction can be obtained according to the folding event, and the first data list records a first capacitance value of each of the capacitance sensors in the capacitance sensing region after the screen state detection instruction can be obtained according to the folding event; and calculate a capacitance change value of the capacitance sensing region according to the first data list and a pre-stored basic data list to obtain the capacitance change rule of the capacitance sensors and determine whether the capacitance change rule meets the preset rule.

Detecting the pre-stored basic data list includes: obtaining, according to a preset method, a second data list of the capacitance sensing region at each of second specified moments, where each of the second specified moments is a moment at which no screen state detection instruction can be obtained according to the folding event and corresponds to the second data list, and the second data list records a third capacitance value corresponding to each of the capacitance sensors at the second specified moment; and obtaining a sum of the third capacitance values corresponding to the capacitance sensors according to a preset correspondence relationship of the capacitance sensors in the second data list, where the capacitance sensor is any one of the capacitance matrices constituting the capacitance touch screen; calculating a specified average capacitance value corresponding to each of the capacitance sensors according to the sum of the third capacitance values, and obtaining an average capacitance value corresponding to each of the capacitance sensors according to a calculation process of the specified average capacitance value; assigning the average capacitance value corresponding to each of the capacitance sensors to the second capacitance value corresponding to the capacitance sensor to obtain the basic data list.

In some embodiments, the processor 180 is configured to detect whether a capacitance change area of the capacitance sensing region corresponding to the coupling capacitance meets a preset area threshold value.

In some embodiments, the processor 180 is configured to determine a number of capacitance sensors in the capacitance sensing region and a size of each of the capacitance sensors to determine a capacitance change area; and detect whether the capacitance change area of the capacitance sensor is greater than the preset area threshold value.

In some embodiments, the processor 180 is configured to detect an arrangement number of the capacitance sensing region or coordinates of the capacitance sensing region in a preset two-dimensional coordinate system; determine a number of capacitance sensors in the capacitance sensing region based on the arrangement number or the number of the coordinates; determine the capacitance change area based on the number of capacitance sensors and a size of each of the capacitance sensors in the capacitance sensing region; and detect whether the capacitance change area of the capacitance sensing region is greater than the preset area threshold value.

In some embodiments, the processor 180 is configured to control the screen state based on the coupling capacitance meeting the first preset condition.

If it is detected that the coupling capacitance meets the first preset condition, it is determined that the screen is in the folded state and the folding screen is controlled to be displayed in the first display state. If it is detected that the coupling capacitance does not meet the first preset condition, it is determined that the screen is in the unfolding state and the folding screen is controlled to be displayed in the second display state. The first display state is an off state and the second display state is an on state.

Specifically, only one screen of the two screens of the terminal device is the folding screen, and the other screen is a flat screen. The flat screen and the folding screen in the unfolding state are arranged back-to-back. The folding screen is used as an inner screen of the terminal device, and the flat screen is used as an outer screen of the terminal device. The folding screen is a first screen, and the flat screen is a second screen.

If it is detected that the coupling capacitance meets the first preset condition, it is determined that the folding screen is in the folded state and the folding screen is controlled to be displayed in a first display state and the other screen of the two screens to be displayed in a second display state, where the first display state is an off state and the second display state is an on state. If it is detected that the coupling capacitance does not meet the first preset condition, it is determined that the folding screen is in the unfolding state and the folding screen is controlled to be displayed in a second display state and the other screen of the two screens to be displayed in a first display state, where the first display state is an off state and the second display state is an on state.

It should be noted that, with respect to the screen state control method described in the present application, those skilled in the art may understand that all or part of flows of implementing the screen state control method described in the embodiments of the present application may be implemented by controlling related hardware with a computer program, which may be stored in a computer readable storage medium, such as a memory of a mobile terminal, and executed by at least one processor in the mobile terminal, and may include the flows of the embodiments of the screen state control method, for example. The storage medium may be a magnetic disk, an optical disk, an Read Only Memory (ROM), an Random Access Memory (RAM), or the like.

Various functional modules of the screen state control apparatus according to the embodiments of the present application may be integrated in one processing chip, or each of the modules may exist independently and physically, or two or more of the modules may be integrated in a module. The integrated module may be implemented in a form of a hardware or in a form of a software functional module. The integrated module may also be stored in a computer-readable storage medium, such as a read-only memory, a magnetic disk, an optical disk, or the like, if it is implemented as a software functional module and sold or used as a stand-alone product.

The screen state control method and apparatus, the storage medium, and the mobile terminal provided in the embodiments of the present application are described above in detail. A specific example is used herein to describe a principle and an implementation of the present application. The description of the foregoing embodiments is merely used to help understand a method and a core idea of the present application. In addition, a person skilled in the art may make changes in a specific implementation manner and an application scope according to an idea of the present application. In conclusion, content of this specification should not be construed as a limitation on the present application.

What is claimed is:

1. A screen state control method, comprising:
detecting a coupling capacitance generated when a folding event occurs;
determining whether the coupling capacitance meets a first preset condition; and
controlling a screen state in response to the coupling capacitance meeting the first preset condition.

2. The method of claim 1, wherein the determining whether the coupling capacitance meets the first preset condition comprises:
detecting a capacitance change value of a capacitance sensing region corresponding to the coupling capacitance to determine whether the capacitance change value is greater than a preset threshold value.

3. The method of claim 2, wherein the detecting the capacitance change value of the capacitance sensing region corresponding to the coupling capacitance comprises:
detecting a first data list of the capacitance sensing region at a first designated moment; and
calculating the capacitance change value according to the first data list and a pre-stored basic data list to determine whether the capacitance change value is greater than the preset threshold value.

4. The method of claim 2, wherein the detecting the capacitance change value of a capacitance sensing region corresponding to the coupling capacitance comprises:
detecting a first data list of the capacitance sensing region at a first designated moment, wherein the first designated moment is a moment after the folding event, and the first data list records a first capacitance value of each of capacitance sensors in the capacitance sensing region after the folding event; and
calculating the capacitance change value of the capacitance sensing region according to the first data list and a pre-stored basic data list to determine whether the capacitance change value is greater than the preset threshold value, wherein the basic data list records a second capacitance value corresponding to each of the capacitance sensors in the capacitance sensing region before the folding event.

5. The method of claim 2, wherein the determining whether the coupling capacitance meets the first preset condition comprises:
detecting whether a capacitance change rule of the capacitance sensing region corresponding to the coupling capacitance meets a preset rule.

6. The method of claim 5, wherein the detecting whether the capacitance change rule of the capacitance sensing region corresponding to the coupling capacitance meets the preset rule comprises:
detecting a first data list of the capacitance sensing region at a first designated moment; and
calculating the capacitance change value of the capacitance sensing region according to the first data list and a pre-stored basic data list to obtain the capacitance change rule of the capacitance sensing region and determining whether the capacitance change rule meets the preset rule.

7. The method of claim 5, wherein the detecting whether the capacitance change rule of the capacitance sensing region corresponding to the coupling capacitance meets the preset rule comprises:
detecting a first data list of the capacitance sensing region at a first designated moment, wherein the first designated moment is a moment after the folding event, and the first data list records a first capacitance value of each of capacitance sensors in the capacitance sensing region after the folding event; and
calculating the capacitance change value of the capacitance sensing region according to the first data list and a pre-stored basic data list to obtain the capacitance change rule of the capacitance sensing region and determine whether the capacitance change value meets the preset rule.

8. The method of claim 2, wherein the determining whether the coupling capacitance meets the first preset condition comprises:
detecting whether a capacitance change area of the capacitance sensing region corresponding to the coupling capacitance is greater than a preset area threshold value.

9. The method of claim 8, wherein the detecting whether the capacitance change area of the capacitance sensing region corresponding to the coupling capacitance is greater than the preset area threshold value comprises:
determining a number of capacitance sensors in the capacitance sensing region and a size of each of the capacitance sensors to determine the capacitance change area of the capacitance sensing region; and
detecting whether the capacitance change area of the capacitance sensor is greater than the preset area threshold value.

10. The method of claim 8, wherein the detecting whether the capacitance change area of the capacitance sensing region corresponding to the coupling capacitance is greater than the preset area threshold value comprises:
detecting an arrangement number of the capacitance sensing region or coordinates of the capacitance sensing region in a preset two-dimensional coordinate system;
determining a number of capacitance sensors in the capacitance sensing region based on the arrangement number or the number of the coordinates;
determine the capacitance change area of the capacitance sensing region based on the number of capacitance sensors and a size of each of the capacitance sensors; and
detecting whether the capacitance change area is greater than the preset area threshold value.

11. The method of claim 1, further comprising:
monitoring data acquired by a first sensor;
determining whether the acquired data meets a second preset condition; and
in response to the acquired data meeting the second preset condition, determining that the folding event occurs.

12. The method of claim 1, further comprising:
monitoring data acquired by a first sensor;
calculating an angle change value of a capacitance sensing region on which the first sensor is disposed from the acquired data;
determining whether the angle change value is within a preset angle range; and in response to the angle change value being within the preset angle range, determining that the folding event occurs.

13. The method of claim 1, further comprising, after determining whether the coupling capacitance meets the first preset condition:

in response to the coupling capacitance meeting the first preset condition, determining that a screen is in a folding state, and controlling the screen to be displayed in a first display state; and in response to the coupling capacitance not meeting the first preset condition, determining that a screen is in an unfolding state, and controlling the screen to be displayed in a second display state.

14. The method of claim 1, wherein the method is performed by a terminal having a screen divided into a first capacitance sensing region and a second capacitance sensing region and comprises:

generating a coupling capacitance by interacting the first capacitance sensing region and the second capacitance sensing region when the folding event occurs;

detecting the coupling capacitance generated when the folding event occurs;

determining whether the coupling capacitance meets the first preset condition; and controlling the screen state based on the coupling capacitance meeting the first preset condition.

15. The method of claim 14, wherein further comprising:

adjusting a magnitude of a voltage applied to a driving line of at least one of the first capacitance sensing region and the second capacitance sensing region; and adjusting a waveform of the voltage applied to the driving line of at least one of the first capacitance sensing region and the second capacitance sensing region.

16. A non-transitory computer readable storage medium storing a computer program which, when executed by a computer, causes the computer to perform following operations:

detecting a coupling capacitance generated when a folding event occurs;

detecting a capacitance change value of a capacitance sensing region corresponding to the coupling capacitance to determine whether the capacitance change value is greater than a preset threshold value; and controlling a screen state based on the capacitance change value being greater than the preset threshold value.

17. The non-transitory computer readable storage medium of claim 16, wherein the detecting the capacitance change value comprises:

detecting a first data list of the capacitance sensing region at a first designated moment, wherein the first designated moment is a moment after the folding event, and the first data list records a first capacitance value of each of capacitance sensors in the capacitance sensing region after the folding event; and calculating the capacitance change value of the capacitance sensing region according to the first data list and a pre-stored basic data list to determine whether the capacitance change value is greater than the preset threshold value, wherein the basic data list records a second capacitance value corresponding to each of the capacitance sensors in the capacitance sensing region before the folding event.

18. The non-transitory computer readable storage medium of claim 16, wherein the operations further comprise:

detecting a coupling capacitance generated when the folding event occurs;

detecting a capacitance change rule of a capacitance sensing region corresponding to the coupling capacitance to determine whether the capacitance change rule meets a preset rule; and controlling the screen state based on the capacitance change rule meeting the preset rule.

19. The non-transitory computer readable storage medium of claim 16, wherein the operations further comprise:

detecting a coupling capacitance generated when the folding event occurs;

detecting a capacitance change area of a capacitance sensing region corresponding to the coupling capacitance to determine whether the capacitance change area is greater than a preset area threshold value; and controlling the screen state based on the capacitance change area being greater than the preset area threshold value.

20. A screen state control apparatus, comprising:

a detection circuit for detecting a coupling capacitance generated when a folding event occurs;

a determination circuit for determining whether the coupling capacitance meets a first preset condition; and a control circuit for controlling the screen state based on the coupling capacitance meeting the first preset condition.

* * * * *